United States Patent [19]

Tate et al.

[11] 3,733,477

[45] May 15, 1973

[54] ITERATIVE BINARY DIVIDER UTILIZING MULTIPLES OF THE DIVISOR

[75] Inventors: Donald P. Tate, St. Paul; Louis Kent Steiner, Minneapolis, both of Minn.

[73] Assignee: Control Data Corporation, Minneapolis, Minn.

[22] Filed: Feb. 4, 1972

[21] Appl. No.: 223,559

[52] U.S. Cl. ....................................................235/164

[51] Int. Cl. ....................................................G06f 7/52

[58] Field of Search ........................235/164, 165, 167

[56] References Cited

UNITED STATES PATENTS

| | | | |
|---|---|---|---|
| 3,223,831 | 12/1965 | Holleran | 235/164 |
| 3,234,366 | 2/1966 | Davis et al. | 235/164 X |
| 3,234,367 | 2/1966 | Ottaway et al. | 235/164 X |
| 3,684,879 | 8/1972 | Koehler | 235/164 X |

*Primary Examiner*—Eugene G. Botz
*Assistant Examiner*—David H. Malzahn
*Attorney*—Joseph A. Genovese & William J. McGinnis Jr.

[57] ABSTRACT

A high speed divider is provided for a digital computer for generating a predetermined number of partial quotient bits per iteration by initially using a decode table implemented by a logic network to examine a predetermined number of high order bits of the divisor and another predetermined number of high order bits of the dividend, on the first iteration, and on successive iterations, of the partial remainder. The decode table is generated using the principle that for a given range of the divisor and dividend, as established by fixing the high order digits thereof, a limited range of possible partial quotients exists. The number of difference networks required to form partial remainders is limited to the number of decoded possible values for the partial quotient to be generated. A number of trial possible partial remainders are generated by the difference networks using the multiples of the divisor equal to the decoded possible partial quotient values. A second decode table, implemented by a logic network, determines, from the multiples of the divisor gated to the difference networks, and the results determined therein, which has produced the new partial remainder for the next iteration. The bits of the partial quotient are determined by a selector which examines the multiples of the divisor gated to the difference networks and the network from which the new partial remainder was derived. The process of iteration continues until the entire quotient is generated.

6 Claims, 5 Drawing Figures

ITERATIVE BINARY DIVIDER UTILIZING MULTIPLES OF THE DIVISOR

BACKGROUND OF THE INVENTION

This invention relates to a high speed divider for a digital computer which produces multi-bit, partial quotients during each iteration of the division using a divisor-dividend logic network for selection of a range of possible partial quotients, a plurality of difference networks, and partial remainder and answer selection logic networks.

The most difficult and expensive arithmetic function to provide in a digital computer is that of division. This is because of the number of hardware items required to accomplish division and the logical complexity of the algorithms necessary to produce division at a speed appropriate to the other arithmetic units in a computer. The development of a fast divider is especially important as the other arithmetic units in the computer are becoming increasingly faster. Generally, division in a computer has been accomplished one step at a time in an iterative process not at all dissimilar to ordinary, long hand, paper and pencil division. This is in contrast to the other arithmetic units of the modern computers which function at a substantially faster rate of operation through techniques which are not comparable to longhand, paper and pencil methods. Consequently, the divider in the arithmetic unit of modern computers tends to be a limiting factor in speed of operation even though it has been found that for many computer applications the division process is called for less frequently than the other arithmetic operations.

One of the more successful high speed dividers heretofore used is that shown in U. S. Pat. No. 3,293,418 to Thornton. This patent shows that a number of quotient bits may be generated per iteration by using a plurality of difference networks to compare the dividend and successively generated partial remainders with all possible multiples of the divisor which can be expressed by the number of bits in the new partial quotient being generated. The example given in the patent shows the generation of two quotient bits per iteration using three difference networks. Expanding this method to the generation of three quotient bits per iteration would require seven difference networks such as adders operating on the complements of the divisor multiples e.g. to compare the multiples of the divisor which can be expressed by the three bits of the partial quotient.

It has been found that the generation of three partial quotient bits per iteration is a practical form for implementing this divider. However, it is not desirable, because of expense and space considerations, to provide seven difference networks for use with the divider unit of a computer. It is therefore desirable to have a high speed divider for generating a multi-bit partial quotient each iteration of a division which would use fewer difference networks than former dividers both in order to reduce the expense of the divider unit of the computer and, in addition, to conserve space in the computer.

SUMMARY OF THE INVENTION

The present invention is a high speed divider for a digital computer for generating a plurality of partial quotient bits during successive steps of the division. The divider of this invention uses a new divider algorithm and hardware requiring fewer difference networks than the above referred to prior art divider for generating a predetermined number of partial quotient bits per iteration.

The divider according to the present invention examines a certain predetermined number of high order bits of the divisor and a certain predetermined number of high order bits of the dividend, or on successive iterations after the first, the partial remainder to establish a range of possible partial quotient values within which the new partial quotient will fall. This process is called decoding. By first establishing a range of partial quotient values the divider limits the number of trial subtractions which must be performed in order to determine the new partial remainder and the correct new partial quotient.

In the form of the invention illustrated, three partial quotient bits are generated at each iteration, as a result of the examination of three high order divisor bits and four high order partial remainder bits to form three possible partial remainders. The arbitrary decision for this form of the invention to examine three high order bits of the divisor and four high order bits of the dividend or partial remainder allows the range of possible partial quotients to be limited to three from the total of eight so that three difference networks may be used instead of the seven required by the prior art.

Once the difference networks have formed the differences between the selected multiples of the divisor and the partial remainder, a partial quotient selection network examines the algebraic signs of the differences between the multiples of the divisor and the partial remainders to determine the largest multiple of the divisor which has been subtracted from the partial remainder without producing a difference having a negative value. That selected difference becomes the new partial remainder while the partial quotient selection is based upon the multiple of the divisor which was gated to the difference nework producing the new partial remainder.

DESCRIPTION OF THE ALGORITHM

Prior to examining the structure and hardware of the high speed divider according to the form of the invention shown herein, a heuristic method will be discussed for determining the number of high order bits of the divisor and the number of high order bits of the dividend, or partial remainder, to be examined in order to produce a certain number of partial quotient bits per iteration. Of course, it is possible to develop a mathematical approach to the problem in view of this description, however the present approach is more illustrative of the operating principles of the divider.

In order to produce the desired limitation in the number of difference networks used to perform division, it is necessary to look at the most significant digits of the divisor. That is, if a divisor only occupies the lower order positions of a divisor register, the upper bits in the register of the form 000 . . . have no value in defining the quotient through a process of finding partial remainders. Thus, the significant bits of the divisor in the form 1XXX . . . are examined, just as in longhand division the number 0004937542 is treated as 4,937,542. The easiest way to insure that the algorithm used in this high speed divider operates on the most significant divisor bits is to use any conventional well understood normalize technique on the divisor before placing it in the divisor receiving register. Summarizing, use of a normalized division in the high speed divider is a convenient way of implementing this algorithm, although not required. What is required is that the bits of the divisor examined by the decode network have the form 1XXX . . . .

As has been explained, use of a normalized divisor is illustrated in this embodiment of the invention, using floating point techniques to account for the exponents of the operands. In floating point mode, exponents are indicated separately from the argument of a number. To normalize a number, the argument of a number is left shifted until the highest order bit is a binary one and the exponent is changed accordingly. Hardware for determining exponents with dividers is conventional, and is consequently not shown here. Thus, using a normalized divisor, the first three binary digits of the divisor may assume four values, i.e., 100, 101, 110 and 111. For convenience, these four possible values of the three high order bits of the binary normalized divisor will be referred to by their octal equivalents 4, 5, 6, and 7.

Initially, certain arbitrary choices must be made to formulate the divide algorithm. For example, the number of bits in the partial quotient to be generated in each cycle must be chosen. The number of partial quotients having a given bit length establishes a range of partial quotients. Here, the partial quotient length has been arbitrarily set at three bits, having a range of eight values: 000, 001, 010, 011, 100, 101, 110, and 111. It is one of the purposes of the present divider to use fewer difference networks to test this range of partial quotients than the seven required under the cited prior art, for example. (Obviously, in the prior art, the eighth value was determined by exclusion of the other seven.) Therefore, to limit the number of difference networks to three for example, it must be determined how many of the high order bits of the divisor and how many of the high order bits of the dividend, or partial remainder, must be examined in order to establish a limited number of possible partial quotients, equal in number to the nuber of adders, i.e., three.

Also, the number of high order bits to be examined of either the divisor or dividend may be arbitrarily set. However, it is necessary to calculate the number of bits to be examined of the quantity not arbitrarily determined. It was decided that three bits of the divisor would be examined, leaving for determination the number of bits of dividend to be examined. As this algorithm is developed it will be seen that once the choices have been made as to the bit length of the partial quotient the number of difference networks or adders to use, and the number of high order bits of either the divisor or dividend to be examined, the remaining choice of the number of high order bits of dividend or divisor to be examined becomes fixed.

Of course, it is appreciated that the arbitrary choices have all been made on the basis of one skilled in the art of designing computer systems in the expectation that these choices will prove to be convenient in terms of the hardware required for the logic networks of the decode tables required in performing the algorithm. Many other choices for the arbitrary selections were possible, some of which may be as convenient and others of which may be more or less convenient but all of which would perform division according to the teachings of the invention when developed according to the principles taught herein.

TABLE I

| B | Q<br>0 | 1 | 2 | 3 | 4 | 5 | 6 | 7 |
|---|---|---|---|---|---|---|---|---|
| 4 | 0 | 4 | 8 | 12 | 16 | 20 | 24 | 28 |
| | 4 | 9 | 14 | 19 | 24 | 29 | 34 | 39 |
| 5 | 0 | 5 | 10 | 15 | 20 | 25 | 30 | 35 |
| | 5 | 11 | 17 | 23 | 29 | 35 | 41 | 47 |
| 6 | 0 | 6 | 12 | 18 | 24 | 30 | 36 | 42 |
| | 6 | 13 | 20 | 27 | 34 | 41 | 48 | 55 |
| 7 | 0 | 7 | 14 | 21 | 28 | 35 | 42 | 49 |
| | 7 | 15 | 23 | 31 | 39 | 47 | 55 | 63 |

To understand the possible partial quotient limiting process further, observe that where a quotient, Q equals A divided by B, for a given integer value of Q there is a maximum value for A when B is the largest and conversely there is a minimum value for A when B is the smallest. Table 1 shows the range of A (decimal) when different multiples of the divisor are used for given integral values of the quotient. Referring to the quotient, Q, as an integral value by looking at the highest three bits thereof, or, for convenience using the octal representations thereof, 0 through 7, means that the high order three bits of the quotient will be the same whether these bits are followed by a succession of all zeros or a succession of all ones or any combination having a numerical value therebetween. Thus, for a partial quotient value of four, the fully developed quotient may be four followed by a succession of zeros or four followed by a succession of sevens (octal). Similarly, for the values of B representing a normalized divisor having octal values of four, five six, and seven, the value of the entire divisor may be exactly equal to the number, five for example or more than the number so long as it is less than the next highest number such as six, for example. Thus, Table 1 provides maximum and minimum values of A for a given quotient and a given range of the divisor B having values from and equal to the number shown in the table and up to but not including the next highest number.

Since only three difference networks will be used to determine the differences between the dividend and the divisor multiples, then interpreting table 1 for the values of the divisor within the table, we can only find the differences of dividends occurring within three vertical columns of the possible partial quotient in any one iteration. For any given A, therefore, it should be found in no more than three columns of quotient for any given divisor, B. Table 1 as constructed, requires examination of six bits of dividend per iteration. Of course, it may be assumed that fewer than six bits of dividend will need to be examined per iteration and it is found by examination of table 1 that no value of A is found in more than three columns of Q for a given B. Therefore, in order to insure that the minimum number of high order bits of the dividend is being examined per iteration, a multiple of two is extracted from table 1. This extraction or division of the values of A in table 1 by two is of course equivalent to examination of only five bits of the dividend.

TABLE II

| B | Q<br>0 | 1 | 2 | 3 | 4 | 5 | 6 | 7 |
|---|---|---|---|---|---|---|---|---|
| 4 | 0 | 1 | 2 | 3 | 4 | 5 | 6 | 7 |
| | 1 | 2 | 3 | 4 | 6 | 7 | 8 | 9 |
| 5 | 0 | 1 | 2 | 3 | 5 | 6 | 7 | 8 |
| | 1 | 2 | 4 | 5 | 7 | 8 | 10 | 11 |
| 6 | 0 | 1 | 3 | 4 | 6 | 7 | 9 | 10 |
| | 1 | 3 | 5 | 6 | 8 | 10 | 12 | 13 |

| | | | | | | | | | |
|---|---|---|---|---|---|---|---|---|---|
| 7 | 0 | 1 | 3 | 5 | 7 | 8 | 10 | 12 | |
| | 1 | 3 | 5 | 7 | 9 | 11 | 13 | 15 | |

This result may be produced in table form with the numbers rounded to integral values. A table produced in this fashion has no value of A located in more than three columns of Q for a given B. Consequently, yet another table may be constructed by extracting another factor of two which is equivalent to examining the upper four bits of the dividend. Table II is the result of this second division by a power of two. No value of A is found in more than three columns of Q for a given B and consequently table III is constructed extracting another power of two to represent an examination of the upper three bits of the dividend. In Table III some values of the dividend are found in more than three columns of the quotient for a given B. Note particularly that the value range represented by a dividend of three is found in four columns of the quotient for a divisor value equal to four.

TABLE III

| B | Q 0 | 1 | 2 | 3 | 4 | 5 | 6 | 7 |
|---|---|---|---|---|---|---|---|---|
| 4 | 0 | 0 | 1 | 1 | 2 | 2 | 3 | 3 |
| | 0 | 1 | 1 | 2 | 3 | 3 | 4 | 4 |
| 5 | 0 | 0 | 1 | 1 | 2 | 3 | 3 | 4 |
| | 0 | 1 | 2 | 2 | 3 | 4 | 5 | 5 |
| 6 | 0 | 0 | 1 | 2 | 3 | 3 | 4 | 5 |
| | 0 | 1 | 2 | 3 | 4 | 5 | 6 | 6 |
| 7 | 0 | 0 | 1 | 2 | 3 | 4 | 5 | 6 |
| | 0 | 1 | 2 | 3 | 4 | 5 | 6 | 7 |

Consequently, it has been determined by this method that where we have arbitrarily decided to use three adders, examine three high order bits of the divisor, and produce partial quotients of three bits per iteration, it is necessary to examine four bits of the dividend on the first iteration and on successive iterations, four bits of the partial remainder as the division progresses in the computer. It will be appreciated that, in developing a divider using the principles taught by this invention, the arbitrary choices may be made as desired and the variable choices remaining may be fixed by a method of analysis similar to that shown, or from a more rigorous mathematical approach which embodies these principles.

TABLE IV

| Partial Remainder | | | | Decimal Equivalent | $D_1$ $D_2$ $D_3$<br>1 0 0<br>4 | $D_1$ $D_2$ $D_3$<br>1 0 1<br>5 | $D_1$ $D_2$ $D_3$<br>1 1 0<br>6 | $D_1$ $D_2$ $D_3$<br>1 1 1<br>7 |
|---|---|---|---|---|---|---|---|---|
| $PR_1$ | $PR_2$ | $PR_3$ | $PR_4$ | | | | | |
| 0 | 0 | 0 | 0 | 0 | 0, 1, 2 | 0, 1, 2 | 0, 1, 2 | 0, 1, 2 |
| 0 | 0 | 0 | 1 | 1 | 0, 1, 2 | 0, 1, 2 | 0, 1, 2 | 0, 1, 2 |
| 0 | 0 | 1 | 0 | 2 | 1, 2, 3 | 1, 2, 3 | 1, 2, 3 | 1, 2, 3 |
| 0 | 0 | 1 | 1 | 3 | 1, 2, 3 | 1, 2, 3 | 1, 2, 3 | 1, 2, 3 |
| 0 | 1 | 0 | 0 | 4 | 3, 4, 5 | 2, 3, 4 | 2, 3, 4 | 2, 3, 4 |
| 0 | 1 | 0 | 1 | 5 | 3, 4, 5 | 2, 3, 4 | 2, 3, 4 | 2, 3, 4 |
| 0 | 1 | 1 | 0 | 6 | 4, 5, 6 | 4, 5, 6 | 3, 4, 5 | 3, 4, 5 |
| 0 | 1 | 1 | 1 | 7 | 5, 6, 7 | 4, 5, 6 | 3, 4, 5 | 3, 4, 5 |
| 1 | 0 | 0 | 0 | 8 | 5, 6, 7 | 5, 6, 7 | 4, 5, 6 | 4, 5, 6 |
| 1 | 0 | 0 | 1 | 9 | 5, 6, 7 | 5, 6, 7 | 4, 5, 6 | 4, 5, 6 |
| 1 | 0 | 1 | 0 | 10 | 7, 7, 7 | 5, 6, 7 | 5, 6, 7 | 5, 6, 7 |
| 1 | 0 | 1 | 1 | 11 | 7, 7, 7 | 5, 6, 7 | 5, 6, 7 | 5, 6, 7 |
| 1 | 1 | 0 | 0 | 12 | 7, 7, 7 | 7, 7, 7 | 5, 6, 7 | 5, 6, 7 |
| 1 | 1 | 0 | 1 | 13 | 7, 7, 7 | 7, 7, 7 | 5, 6, 7 | 5, 6, 7 |
| 1 | 1 | 1 | 0 | 14 | 7, 7, 7 | 7, 7, 7 | 7, 7, 7 | 5, 6, 7 |
| 1 | 1 | 1 | 1 | 15 | 7, 7, 7 | 7, 7, 7 | 7, 7, 7 | 5, 6, 7 |

Table 4 is a translation of table 2 showing the four possible values of divisor versus the 16 possible combinations for the upper four bits of the dividend with the three possible partial quotient values shown at intersections. Partial quotient values are indicated in decimal representation while, for this table, the values of the bits of the divisor and dividend are written in both decimal and binary. The bit positions of the divisor are assigned the code values D1, D2 and D3, while the partial remainder values are assigned the code values of $PR_1$, $PR_2$, $PR_3$, and $PR_4$. Using Boolean logic operating on the symbols for the bit positions of the divisor and partial remainder, Chart 1 is made from Table IV showing a truth table of when a certain multiple of the divisor exists as a possible partial quotient value. This chart shows for example that five is a possible partial quotient when $PR_1$ is a binary 1 or when $PR_2$ and $PR_3$ are both binary ones or when $PR_2$ is a binary one and both D2 and D3 are binary 0's. From this example and a knowledge of Boolean logic familiar to everyone skilled in the computer art, the significance and development of this chart will be appreciated.

CHART I

Possible
Partial
Quotient $5 = PR_1 + PR_2\, PR_3 + PR_2\, (\overline{D}_2\, \overline{D}_3)$ $2 = \overline{5} = \overline{PR_1}\, \overline{PR_2} + \overline{PR_1}\, \overline{PR_3}\, (D_2 + D_3)$ $6 = PR_1 + (PR_2\, PR_3)\, \overline{D}_2$ $0 = \overline{PR_1}\, \overline{PR_2}\, \overline{PR_3}$ $3 = \overline{6} + \overline{0}$ $1 = \overline{PR_1}\, \overline{PR_2}$ $7 = PR_1\, \overline{D}_2 + PR_1\, PR_2 + PR_1\, PR_3 + PR_2\, PR_3\, PR_4\, \overline{D}_2\, \overline{D}_3$ $4 = \overline{PR_1}\, PR_2\, (D_2 + D_3) + PR_1\, \overline{PR_2}\, \overline{PR_3}\, D_2 + \overline{PR_1}\, PR_2\, \overline{PR_3} + \overline{PR_1}\, PR_2\, PR_3\, \overline{PR_4} = \overline{7} + \overline{1}$ It is clear that using Chart I a logic circuit may be made which will operate upon electrical signals corresponding to the values of the upper four bits of the dividend, or on iterations after the first, the partial remainder, and on the upper three bits of the divisor to determine the appropriate multiple of the divisor to gate to the difference networks. It is clear that some values of partial remainder and divisor will only require two possible quotients to be gated to the adders while others require three. In this case nothing is lost by gating a so called redundant value to the difference networks. However, the redundant value is chosen so as to have the greatest possible usefulness with respect to other combinations of divisor and partial remainder which will require that same combination of divisor multiplies to be gated to the difference networks.

By analysis of Chart I, it is possible to determine which values must be gated to the various adders so that no adder will be required to perform two difference operations simultaneously. Thus, an A adder is assigned the values of 1 times, 4 times and 7 times the divisor, a B adder is assigned 2 times and 5 times the divisor, while a C adder is assigned 0 times, 3 times, and 6 times the divisor as multiples respectively to be gated to the adders after operation of the decode network.

DESCRIPTION OF THE PREFERRED EMBODIMENT

In this disclosure, a description of the construction of a divider according to this invention is given. Data path connections are described in the sense that they exist but that data only flows as required at the appropriate times. This description makes specifically clear when data transfer is to occur.

Figure 1:
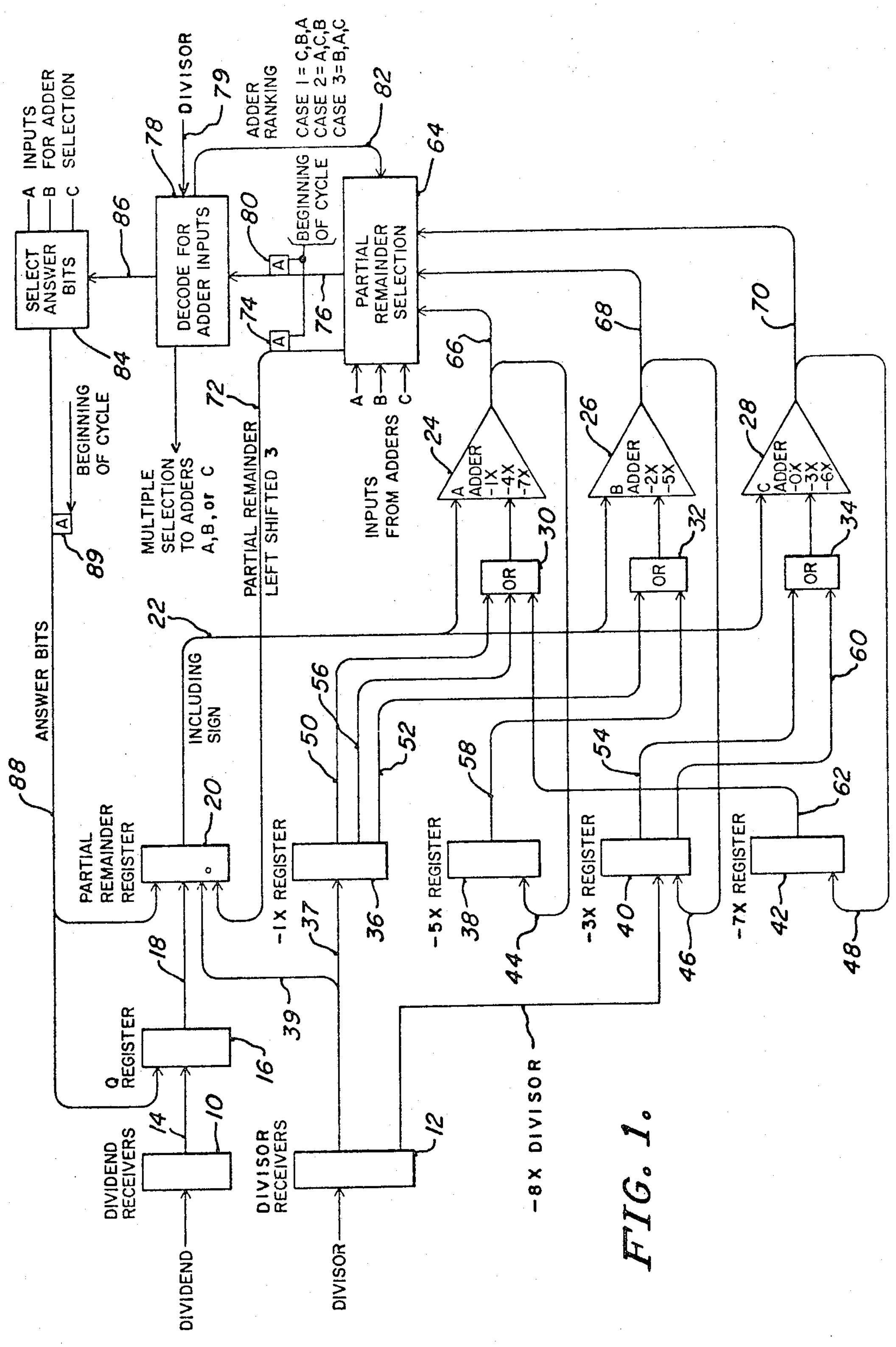
FIG. 1 is a schematic block diagram of a divider according to the present invention.

Referring now to FIG. 1, the dividend is initially entered into a dividend receiver 10 and the divisor is initially entered into a divisor receiver 12. This function is accomplished by other portions of a computer which may function in any conventional manner. A data path connection 14 exists between the dividend receiver 10 and a Q register 16 in which the quotient is developed. Connections, such as connection 14, are data path connections sufficient for transferring binary numbers of the required or a desired magnitude. From the Q register 16 a connection 18 is made to a partial remainder register 20. In this particular embodiment of the invention it has been found convenient to pass the dividend through the Q register to register 20 prior to the first iteration in developing the quotient. Thereafter the Q register 16 is used only for holding quotient bits as they are developed while the partial remainder register 20 holds the successive partial remainders on successive iterations of the division. The first pass or first iteration of the division is defined as that portion of the division which uses the dividend to form the first partial quotient. The dividend is not stored after the first pass as only the most recently developed partial remainder is required for the formation of new partial remainders.

A connection 22 for transferring the contents of the partial remainder register 20 is made to one input of an A adder 24, a B adder 26, and a C adder 28. The other input to each of the 3 adders is controlled by an OR gate. OR gate 30 is associated with adder 24, OR gate 32 with adder 26 and OR gate 34 with adder 28. In this embodiment of the invention adders perform the function of finding the difference between the dividend or partial remainder and the chosen multiple of the divisor using the complements of the divisor multiples. These adders are of a class referred to generally as difference networks since there are many equivalent ways of finding the difference of two numbers, no one of which is critical to the invention. In this embodiment of the invention, the complements of the divisor multiples are used in forming the differences using adders. Adder 24 is assigned the function of finding the difference with respect to one times, four times, and seven times the divisor. OR gate 30 has made available to it the three multiples of the divisor used in the associated adder. One of the multiples is chosen by logic circuitry, as will be described hereinafter, for gating to the adder. The operation of OR gates 32 and 34 with respect to adders 26 and 28 is similar.

Since a difference operation is to be performed using adders, the complements of the various multiples of the divisor are stored in registers and the complements are gated to the three adders, in this embodiment of the invention. Register 36 has the divisor gated to it from divisor receiver 12 through a connection 37 and thereafter produces the one times, two times, and four times complement of the divisor using well known and understood methods. Register 38 stores the five times complement of the divisor. Register 40 stores the three times complement of the divisor and gates the six times complement of the divisor as required using well known methods. The seven times complement of the divisor is stored in register 42.

Since it is possible to produce the two times and four times complement of the divisor in a register directly from the divisor by transferring the divisor left-shifted by one or two bit positions, these quantities need not be stored separately from one another. However, since the three times, five times, and seven times complement of the divisor must be produced using adders they must be produced and stored separately and independently prior to the actual difference operation with respect to the three chosen multiples of the divisor. It is possible to do this operation by any of a number of means independent of the divisor algorithm. However, it has been found convenient to use the same three adders used in the divide algorithm for initially producing the divisor multiples. Adder 24 adds one times and four times the divisor complement which is then gated through connection 44 to register 38 to produce the five times complement of the divisor. Similarly adder 26 adds one times and two times the divisor and gates the result through connection 46 to register 40 for producing the three times complement of the divisor. In a slightly different fashion, adder 28 subtracts one times the divisor from eight times the divisor and gates the seven times complement of the divisor through connection 48 to register 42. Finally, interconnections 50, 52, 54, 56, 58, 60 and 62 connect the one times, two times, three times, four times, five times, six times and seven times divisor multiple complements respectively from the registers to the OR gates on the adder inputs. A connection 39 supplies the divisor from register 12 to register 20 to provide a second input to the adders during the multiple formation cycle.

The output results from the three adders are connected to a partial remainder selection device 64 by connections 66, 68 and 70 associated with adders 24, 26 and 28 respectively. The partial remainder selection device determines, as will be hereinafter described in greater detail, which adder has the correct partial remainder for the next iteration of the divide algorithm. A connection 72 from the partial remainder selection device 64 to the partial remainder register 20 serves to transfer the new partial remainder, when it is selected, to the partial remainder register 20 for the start of the new cycle. AND gate 74 in connection 72 is shown connected to a control timing signal to indicate this start cycle function symbolically. It will also be appreciated that the partial remainder gated to the partial remainder register at each iteration of the division will be left shifted three places during this transfer.

The partial remainder selection device is also connected by a connection 76 to a decode network 78 for selecting which multiples of the divisor should be gated to the adders. The decoder 78 receives the upper four bits of the new partial remainder from the partial remainder selection device 64. Again this function is controlled at the beginning of the cycle by an AND gate 80 shown symbolically connected to a control signal. In addition, the decode network 78 must supply information through a connection 82 to the partial remainder selection device 64 as to the values of the divisor multiple gated to the respective adders. This is so that the partial remainder selection device will have a listing of the relative order of the adders with respect to the ranking of the values of the divisor multiples gated to the adders. As shown in FIG. 1, there are three combinations of ranking of the multiples gated to the adders.

An answer bit selector 84 receives information from the decode network 78 through a connection 86 which provides information as to which multiples were gated to the adders. In addition, the answer bit selector 84 receives information as to which adder was selected as having produced the correct new partial remainder. From this information the answer selector produces a partial quotient which is passed through a connection 88 to the Q register 16 during all iterations except the last. On the last iteration there is no partial remainder generated, so simultaneously the contents of the Q register are passed to the partial remainder register 20 as the last three partial quotient bits are supplied. AND gate 89 controls the data flow to registers 16 and 20. This procedure in developing the partial quotient is of course convenient in this embodiment of the invention but other arrangements are possible within the spirit of the invention. Once the quotient is stored in the partial remainder register during the last iteration of the division, it is available for transfer out of the system, through conventional networks, not shown.

Figure 2A:
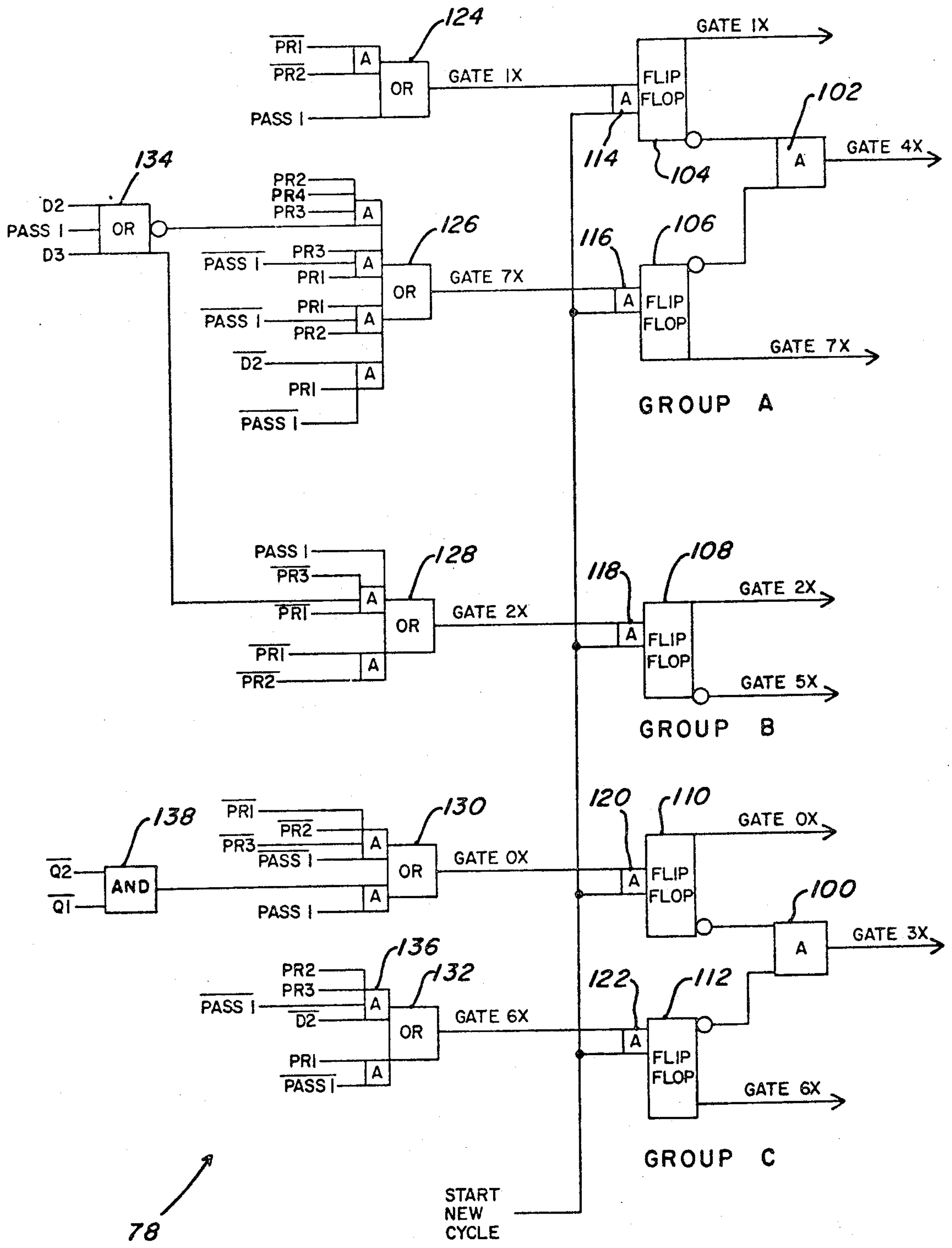
FIG. 2A is a detailed logic diagram of a portion of one of the schematically indicated boxes of FIG. 1.

Referring now to FIG. 2A, the decode network 78, which in this embodiment of the invention decodes the upper 3 bits of a normalized divisor and the upper four bits of the dividend or partial remainder in order to determine which three of eight possible multiples of the divisor to use in forming a partial remainder, is shown. At the far right hand side of the figure, output control lines are shown arranged in three groups for the eight values of the possible divisor multiples. The first group relating to the A adder 24 has control line outputs for 1 times, 4 times and 7 times the divisor, the second group, relating to adder 26, has outputs for 2 times and 5 times the divisor, and the third group, relating to adder 28, has outputs for zero times, 3 times and 6 times the divisor. Since the adders operate on the complements of the divisor multiples, the divisor is in fact entered into register 12 (FIG. 1) in complemented form. However, the decode network 78 is designed to operate on the uncomplemented or true number and the true number is input to the network through connection 79 shown on FIG. 1, Looking at group B, for example, which is used only for the multiples of 2 times and 5 times the divisor, it is seen that adder 26 will have to gate one or the other of the two values. From the Boolean notation shown in Chart 1, it is seen that it is easier to determine when to gate 2 times than to gate 5 times, because of the number of terms required in the expression. Consequently, a logic circuit is provided to decide when 2 times should be gated and this network determines that 5 times should be gated any time when there is no signal input to gate 2 times. In a similar fashion, looking at groups A and C for example, it is found that it is comparatively easier to determine a circuit from Chart 1 for gating 1 times and 7 times or 0 times and 6 times the divisor, respectively, than it is to determine a circuit using Boolean logic for the gating of 3 times and 4 times the divisor because of the length of the expression involved. Since these multipees are related to specific adders, it is possible to gate 4 times and 3 times the divisor at such times as neither zero times or 6 times or neither 1 times nor 7 times is being gated.

Therefore, again referring to FIG. 2A, gates 100 and 102 determine the gating of 4 times and 3 times multiples of the divisor in the absence of the command to gate 1 times or 7 times or the command to gate zero times or 6 times respectively. Flip flops 104, 106, 108, 110 and 112 produce two outputs, the one output being identical to the input and the other output being the opposite or NOT of the input. The NOT output of flip flops 104 through 112 is denoted by the output having the small circle at lead line termination. AND gates 114, 116, 118, 120, and 122 supply the inputs to the flip flops, respectively. The AND gates are anded with a timing signal from the control mechanism for the divider, a typical and well understood function in modern computers, in order to control the gating of the multiples to the adders at the correct portion of the cycle. The other inputs to these AND gates are determined by OR gates 124, 126, 128, 130 and 132.

On pass one of the division, that is when the entire dividend is examined for the first iteration, a slightly different procedure is employed than on successive passes when the left shifted partial remainder is examined. In effect, on the first pass a left shift of only one place occurs and consequently the decode for the first pass must be slightly different than for successive passes. Consequently, examining OR gate 124 it will be observed that on the first pass, 1 times the divisor is always gated. On successive iterations it will be seen from the Boolean logic symbolism illustrating the figure that not partial remainder digit 1 ($\overline{PR}_1$) and not partial remainder digit 2 ($\overline{PR}_2$) cause the gating of 1 times the divisor. That is, if the digits of the partial remainder are OOXX, regardless of what the digits of the divisor are, then one times the divisor is gated to adder A. Similarly, examining OR gate 126 which controls the gating of 7 times the divisor it will be seen that there are 4 possible combinations of inputs which will cause the gating of 7 times the divisor as a possible A adder input. For example, it will be noted that all of these conditions, including the secondary condition received from OR gate 134 require that it be some iteration other than the first pass. This is consistent because the same adder is required to perform the difference on both 1 times and 7 times the divisor. Consequently, if one times the divisor is always gated on pass 1, then 7 times the divisor could never be gated on pass 1. From the labeled inputs to the AND gates associated with OR gate 126, the other possible conditions requiring a gating of 7 times the divisor are illustrated using Boolean symbolism. The statement of a quantity indicates its presence, or a 1 while the bar over a quantity indicates its absence, or a zero. It will also be appreciated that the combinations of inputs to OR gates 124 and 126 are not all possible combinations of the various divisor and partial remainder bits, thus providing for the gating of 4 times the divisor as previously described. From this description it will be appreciated how to read FIG. 2A for the selection of the other multiples.

As one further example, however, examination of AND gate 136 shows that this gate determines one of the two possible circumstances in which 6 times the divisor is gated to the adder. One of these conditions occurs when the second and third partial remainder bits are both ones and it is not the first pass of the division and the second divisor digit is a zero. The other of these conditions occurs when the first partial remainder digit is one for passes after the first. Referring now to one of the two possible circumstances in which zero times the divisor is used in the adder, it will be seen that AND gate 138 is required in order to determine whether or not zero times the divisor should be gated on pass 1. The logic indicates that on pass 1, zero times the divisor should be gated whenever both the first and second digits of the dividend are zero, and that three times the divisor will be gated in all other cases. The Q1 and Q2 symbols are used because the dividend is sampled in the Q register 16 for the first pass.

Figure 2B:
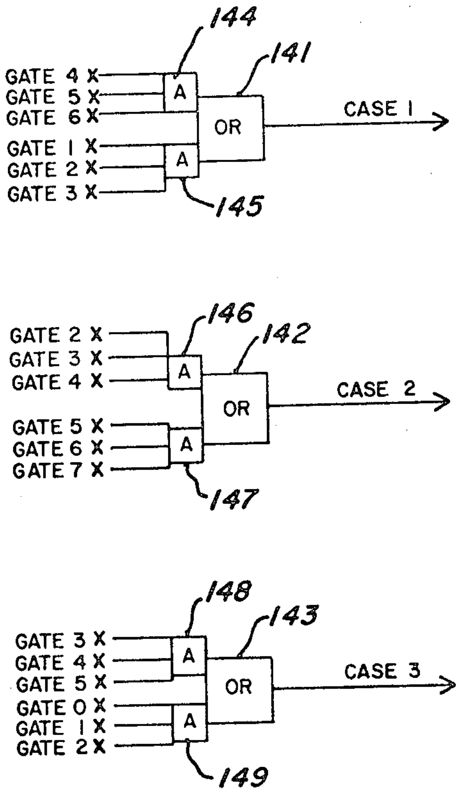
FIG. 2B is a detailed logic diagram of another portion of one of the schematically indicated boxes of FIG. 1.

Referring now to FIG. 2B, a further logic network is provided for determining the ranking of the 3 adders as to the numerical order of the divisor multiples assigned thereto. As will be explained, the new partial remainder is selected by determining which adder had the largest divisor multiple gated to it and still produced a mathematically positive result. Since the same adder does not always receive the largest divisor multiple, the partial remainder selection network must recieve information indicating which adder has received the largest divisor multiple. This is the function of the network shown in FIG. 2B.

For example, saying that we have adders A, B and C and that 1 times, 2 times, and 3 times the divisor multiples are being gated to these adders, then the adder ranking is C, B, A, which is called case 1. It is also seen that when the adders are required to gate 4, 5, and 6 that this is also a case 1 situation. In addition, it can be seen that where the adder order is A, C, B as in case 2 this corresponds to the adders being required to gate the values 2, 3, and 4 or 5, 6, and 7. Similarly, for case 3 the adders may be required to gate the values of 3, 4, and 5 corresponding to B, A, C, in the adder ranking.

The circuit of FIG. 2B has as its input the gating connections for multiples of the divisor as determined by the portion of the decode network shown in FIG.2A. In FIG. 2B, logic is implemented with three OR gates 141, 142, and 143 operating on the output of AND gates 144 and 145, 146 and 147, 148 and 149 respectively.

Figure 3:
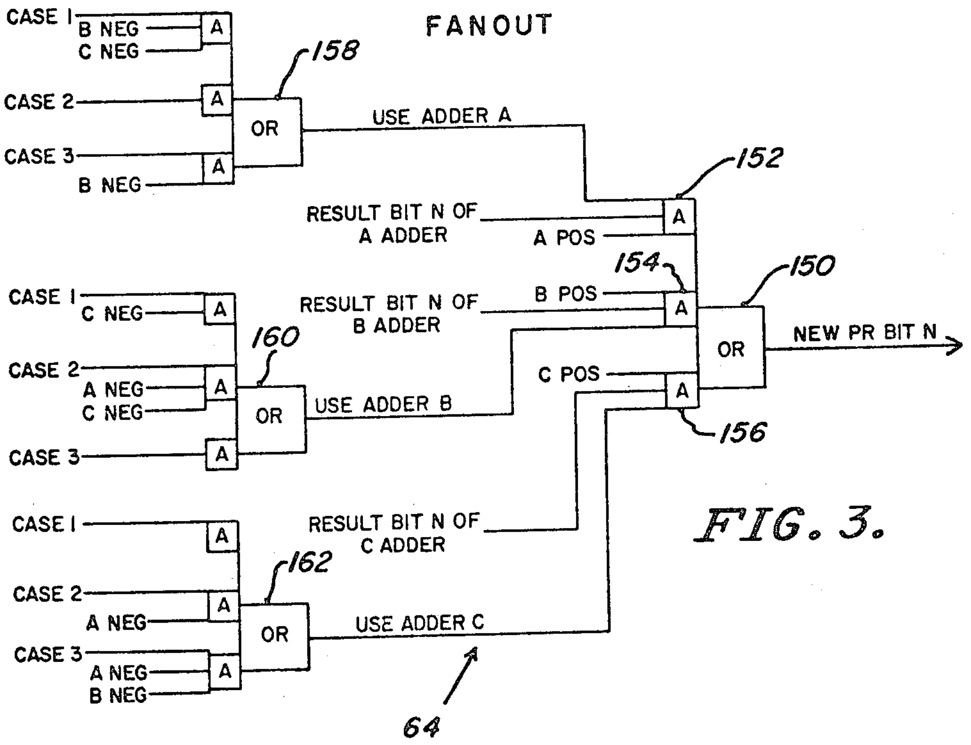
FIG. 3 is a detailed logic diagram of another of the schematically indicated boxes of FIG. 1.

Referring now to FIG. 3 showing the selection of the partial remainder, it must be appreciated that the circuit shown is for a typical bit of the new partial remainder, and that a fanout (schematically indicated by the label in the figure) of the selection the partial remainder must extend to all of the individual bits of the selected partial remainder.

Three AND gates 152, 154, and 156 perform the logic function of determining which of the three possible bits for a given position is to be transmitted. In this respect AND gates 152, 154 and 156 cause the selected bit to be gated through the AND gate at such time as the result of the corresponding adder, as labeled on the drawing, has a positive sign and the other conditions as determined by OR gates 158, 160 and 162 are satisfied, for the respective cases. The inputs to the AND gates feeding the three OR gates consist of one input corresponding to each of the 3 possible adder rankings. There is also a logic condition, for example, for OR gate 158, that if the adder ranking corresponds to case 1, the result of adders B and C be negative. For case 2 there is no condition on the sign of adder A, at this logic level, but at the AND gate 152 there is the condition that the A adder have a positive output. It would be possible for example to superimpose the A adder positive requirement in each of the three AND gates associated with OR gate 158 rather than the once associated with AND gate 152. In the same manner, the diagram is self-explanatory as to the ranking logic associated with the other OR gates 160 and 162 with respect to the respective inputs. The logic circuit of FIG. 2B provides the required information to the inputs of the circuit shown in FIG. 3 as to which multiples have been gated to the adders. The new partial remainder selected is that produced by the adder having the largest multiple of the divisor gated to it for comparison with the previous partial remainder and which has a mathematically positive value.

Figure 4:
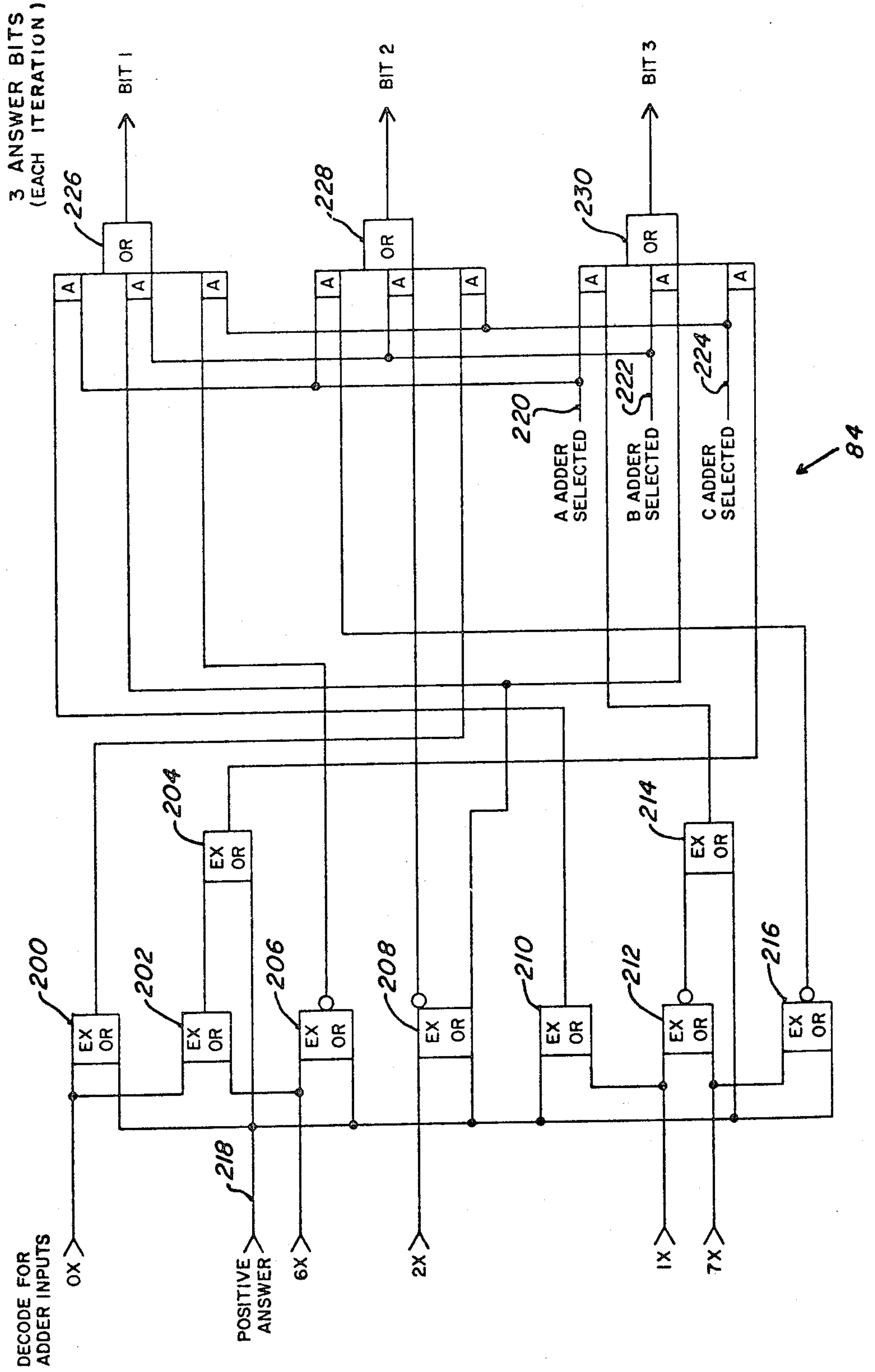
FIG. 4 is a detailed logic diagram of yet another of the schematically indicated boxes of FIG. 1.

Referring now to FIG. 4, the logic network for producing the three bits of the partial quotient, as generated in this embodiment of the invention, is shown. This figure corresponds to the logic network of box 84 on FIG. 1. As with the other logic networks shown with this embodiment of the invention, a complete description of each and every portion of the circuit is not required, where exemplary material is provided and where the circuit is well labeled. At the far left hand side of the diagram, are inputs corresponding to outputs from the portion of FIG. 2A representing the controls for 0 times, 6 times, 2 times, and 1 times and 7 times the divisor. As in FIG. 2A the circuit of FIG. 4 establishes that the 3 times, 4 times, and 5 times multiples of the divisor are used through the process of elimination. Exclusive OR circuits 200 through 216 operate on these inputs as labeled. Input 218 is provided to gate the formation of the correct answer bits when the answer is to be positive, a condition determined by an initial examination of the divisor and dividend through a conventional logic network not shown here. Inputs 220, 222 and 224 from the partial remainder selector 64 provide the additional information necessary as to which adder has produced the new partial remainder for OR gates 226, 228, and 230 to construct the three bits of the partial quotient.

As an example of the operation of the circuit of FIG. 4, the generation of the answer bits 101, corresponding to the numeral five, will be described. Initially, for example, the decode network determines that four, five, and six times the divisor will be used to perform trial subtractions for the new partial remainder. Assume also that a positive answer is to be produced, and that the positive answer input has been set as a 1. The exclusive OR's have a 1 normal output when the two inputs are different and a zero normal output when the inputs are alike. The 0 times input is set at 0 and the 6 times input set at 1. Therefore, exclusive OR 202 has a 1 output causing exclusive or 204 to have a 0 output because its other input is a 1 for a positive answer. Similarly, the 2 times input is 0 so the normal output of exclusive OR 208 is a 1 and the not output is a 0. Information is thus generated corresponding to the 5 times input from the absence of a 2 times input. Similarly, exclusive OR 212 indicates information for a 4 times input from the absence of both 1 times and 7 times inputs. The single outputs for exclusive OR's 210, 214, and 216 are all 1's. With the given information supplied to the inputs, all of the exclusive OR's provide an output which is received as one of two inputs for each of the AND gates associated with OR circuits 226, 228 and 230. Since we are assuming in this example that the correct new partial quotient is five, this requires that the B adder (26 in FIG. 1) be selected as having produced the new partial remainder, since the five times multiple of the divisor was gated to that adder. Input on the B adder selection line 222 makes the other input to one of the AND gates associated with each of the three OR gates 226, 228 and 230. These three AND gates then transfer the 1 inputs received from the exclusive OR's or remain with a 0 out to generate the required bits: 101.

It is appreciated that certain clock timing pulses have been omitted from the diagrams associated with the description of this embodiment of the invention since they may be readily supplied by one skilled in the art from the foregoing description and the figures. Some simplification of the figures has resulted in a greater ease of presentation without loss of understanding of the invention through omitting those details which would be obvious to implement, and which are not required or specific as to any one of the many embodiments according to the spirit of the invention hereinbefore described and hereinafter claimed.

In operation, the divider performs the following functions in the following order as a time sequence. First, the divisor is stored in the divisor register 12 and the dividend is stored in the dividend register 10. Next the various multiples of the divisor which cannot be generated within registers by shifting in a conventional manner are stored for use throughout the various iterations of the division. Simultaneously, or essentially simultaneously, the 4 highest digits of the dividend and the three highest digits of the divisor are made available to the decode network 78 for a determination as to which of the generated multiples of the divisor will be used for performing a difference with respect to the dividend on the first pass and with respect to the partial remainder on successive iterations of the division. Next, the multiples of the divisor selected by the decode network 78 are gated to the difference networks (adders) and a difference operation is performed with respect to the partial remainder or the dividend. Next, the partial remainder selection network 64 operates using the difference network ranking generated by the decode network 78 and the mathematical signs resulting from the difference operations to select which of the three possible partial remainders is the correct partial remainder. Next, the partial quotient bits for this iteration of the division are generated by the answer decode network 84. The starting point of the divider operation, for this form of the invention, on successive iterations of the division, is nominally declared to be that point at which the partial remainder is gated back to the partial remainder register 20 while the decode network 78 determines which new multiples of the divisor are to be gated to the difference networks and the answer bits are stored. It is appreciated that the partial remainder is left shifted 3 places with each iteration of the division and prior to comparison with the divisor multiples. This is a conventional step with computers or ordinary longhand division and need not be explained further.

What is claimed is:

1. A high speed divider for performing iterative division of a dividend by a divisor in a digital computer comprising:

means for storing the divisor, means for storing the dividend at the initiation of the division and partial remainders during successive iterations of the division, means for storing partial quotients developed on iterations of the division until a complete quotient is developed, decode means, connected to said means for storing a divisor and to said means for storing a dividend, for determining a selected number of possible partial quotients, from a range of partial quotients, by examination of a first predetermined number of high order divisor bits, and a second predetermined number of high order dividend bits, and on successive iterations of the division, partial remainder bits, means, connected with said decode means and said means for storing a divisor, for producing multiples, equal to the possible partial quotients determined by said decode means, of the divisor, means, connected to said means for storing a dividend and to said means for producing multiples of the divisor, for determining the differences between each of the selected divisor multiples and the dividend, intially, and the partial remainder on successive iterations, partial remainder selector means, connected to said difference determining means, for determing which of said differences is the new partial remainder by examination of the algebraic signs of the differences developed with regard to the divisor multiples used in determining the differences, and answer selector means for determining the partial quotient developed by examination of the differences developed by said difference means with respect to the divisor multiples used in determining said differences.

2. The divider of claim 1 wherein three bits of the divisor and 4 bits of the dividend or partial remainder are examined per iteration.

3. The divisor of claim 1 wherein said differences are determined by three difference networks wherein 3 bits of partial quotients are developed per iteration and wherein said first difference network performs differences with respect to one times, four times, and seven times the divisor, and said second difference network differences with respect to two times and five times the divisor, and wherein said third difference network finds differences with respect to a zero times, three times and six times the divisor.

4. The divider of claim 3 and further comprising means for determining the ranking of the difference networks with respect to the numerical order of divisor multiples chosen for differencing.

5. The divider of claim 4 wherein said partial remainder selector determines the correct partial remainder from the three partial remainders produced by examining the signs of the partial remainders with respect to the ranking determined by said means for determining the ranking of said difference networks.

6. The divider of claim 5 wherein said answer selector determines the quotient bits of the new partial quotient by examining the difference network which has produced the new partial remainder with respect to the divisor multiple examined by said difference network.

* * * * *